United States Patent [19]
Singer et al.

[11] Patent Number: 4,916,635
[45] Date of Patent: Apr. 10, 1990

[54] SHAPING COMMAND INPUTS TO MINIMIZE UNWANTED DYNAMICS

[75] Inventors: Neil C. Singer, Brookline; Warren P. Seering, Sherborn; Kenneth A. Pasch, Brookline, all of Mass.

[73] Assignee: Massachusetts Institute of Technology, Cambridge, Mass.

[21] Appl. No.: 243,315

[22] Filed: Sep. 12, 1988

[51] Int. Cl.$^4$ .............................................. G06F 15/00
[52] U.S. Cl. ................................... 364/513; 364/184; 364/193; 364/553; 324/77 B
[58] Field of Search ............... 364/513, 184, 553, 193; 324/77 B

[56] References Cited

U.S. PATENT DOCUMENTS 4,547,858 10/1985 Horak ................................. 364/513
4,677,568 6/1987 Arbter ................................. 364/513

OTHER PUBLICATIONS

Bayo, "Computed Torque for the Position Control of Open-Chain Flexible Robots," *Proceedings of the 1988 IEEE International Conference on Robotics and Automation*, Apr. 1988, pp. 316-321, Philadelphia, PA.
Meckl and Seering, "Controlling Velocity-Limited Systems to Reduce Residual Vibration," *Proceedings of the 1988 IEEE International Conference on Robotics and Automation*, Apr. 1988, Philadelphia, PA.
Singer and Seering, "Using Acausal Shaping Techniques to Reduce Robot Vibration," *Proceedings of the 1988 IEEE International Conference on Robotics and Automation*, Philadelphia, PA.
Meckl and Seering, "Reducing Residual Vibration in Systems with Time Varying Resonances," *Proceedings of the 1987 IEEE International Conference on Robotics and Automation*, Apr. 1987, Raleigh, NC, pp. 1690-1695.
Sehitoglu and Aristizabal, "Design of a Trajectory Controller for Industrial Robots Using Bang-Bang and Cycloidal Motion Profiles," *Robotics: Theory and Applications*, ASME Winter Annual Meeting, Anaheim, CA, Dec. 1986, pp. 169-175.
Junkins and Turner, "Optimal Spacecraft Rotational Maneuvers," Elsevier Science Publishers, N.Y., 1986.
Wang et al., "Open-Loop Control of a Flexible Robot Manipulator," *International Journal of Robotics and Automation*, vol. 1, No. 2, 1986, pp. 54-57.
Meckl and Seering, "Minimizing Residual Vibration for Point-to-Point Motion," *ASME Journal of Vibration, Acoustics, Stress and Reliability in Design*, vol. 107, No. 4, Oct. 1985, pp. 378-382.
Chung et al., "Disturbance-Accomodating Tracking Maneuvers of Flexible Spacecraft," *Journal of the Astronautical Sciences*, 1985, vol. 33, No. 2, pp. 197-216.
Juang et al., "Closed-Form Solutions for Feedback Control with Terminal Constraints," *Journal of Guidance and Control*, Jan.-Feb. 1985, vol. 8, No. 1, pp. 39-43.
Meckl and Seering, "Feedforward Control Techniques to Achieve Fast Settling Time in Robots," *Proceedings of the American Controls Conference*, Seatle, WA., Jun. 1986.
Gupta, "Frequency-Shaped Cost Functionals: Extension of Linear-Quadratic-Gaussian Design Methods," *Journal of Guidance and Control*, vol. 3, No. 6, Nov.-Dec. 1980, pp. 529-35.
Swigert, "Shaped Torque Techniques," *Journal of Guidance and Control*, Sep.-Oct. 1980, vol. 3, No. 5, pp. 460-467.
Aspinwall, "Acceleration Profiles for Minimizing Residual Response," *Journal of Dynamic Systems, Measurement, and Control*, Mar. 1980, vol. 102, No. 1, pp. 3-6.
Farrenkopf, "Optimal Open-Loop Maneuver Profiles for Flexible Spacecraft," *Journal of Guidance and Control*, vol. 2, No. 6, Nov.-Dec. 1979, pp. 491-498.
Smith, "Feedback Control Systems," McGraw-Hill Book Company, Inc., N.Y., 1958.

*Primary Examiner*—Allen MacDonald
*Attorney, Agent, or Firm*—Choate, Hall & Stewart

[57] ABSTRACT

A sequence of impulses is determined which eliminates unwanted dynamics of a dynamic system. This impulse sequence is convolved with an arbitrary command input to drive the dynamic system to an output with a minimum of unwanted dynamics. The input sequence is time optimal in that it constitutes the shortest possible command input that results in no unwanted dynamics of the system subject to robustness and implementation constraints. The preshaping technique is robust under system parameter uncertainty and may be applied to both open and closed loop systems.

27 Claims, 11 Drawing Sheets $D_i$ are time delays $K_i$ are gain factors $$K = e^{-\frac{\zeta\pi}{\sqrt{1-\zeta^2}}}$$
$$\Delta T = \frac{\pi}{\omega_0\sqrt{1-\zeta^2}}$$

(a) Requested Command (b) Impulse Sequence (c) Convolution Result $D_i$ are time delays $K_i$ are gain factors

SHAPING COMMAND INPUTS TO MINIMIZE UNWANTED DYNAMICS

The Government has rights in this invention pursuant to Grant Number N00014-86-K-0685 awarded by the Department of the Navy.

BACKGROUND OF THE INVENTION

This invention relates to a method for generating an input to a system to minimize unwanted dynamics.

Control of machines that exhibit unwanted dynamics such as vibration becomes important when designers attempt to push the state of the art with faster, lighter machines. Three steps are necessary for the control of a flexible plant. First, a good model of the plant must exist. Second, a good controller must be designed. Third, inputs to the controller must be constructed using knowledge of the system dynamic response. There is a great deal of literature pertaining to modeling and control but little dealing with the shaping of system inputs. The numbers in brackets below refer to references listed in the Appendix, the teachings of which are hereby incorporated by reference.

Command shaping involves preshaping either actuator commands or setpoints so that unwanted dynamics are reduced. This aspect of control is often ignored because it is mistakenly considered to be useful only for open loop systems. However, if the input shaping accounts for the dynamic characteristics of the closed loop plant, then shaped input commands can be given to the closed loop plant as well. Thus, any of the preshaping techniques may be readily used as a closed loop technique. [11] [16]

The earliest form of command preshaping was the use of high-speed cam profiles as motion templates. These input shapes were generated so as to be continuous throughout one cycle (i.e. the cycloidal cam profile). Their smoothness (continuous derivatives) reduces unwanted dynamics by not putting high frequency inputs into the system [12]; however, these profiles have limited success.

Another early form of setpoint shaping was the use of posicast control by O. J. M. Smith [16]. This technique involves breaking a step of a certain magnitude into two smaller steps, one of which is delayed in time. This results in a response with a reduced settling time. In effect, superposition of the responses leads to vibration cancellation. However, this is not generally used because of problems with robustness. The system that is to be commanded must have only one resonance, be known exactly, and be very linear for this technique to work.

Optimal control approaches have been used to generate input profiles for commanding vibratory systems. Junkins, Turner, Chun, and Juang have made considerable progress toward practical solutions of the optimal control formulation for flexible systems. [18] [24] [25] Typically, a penalty function is selected (for example integral squared error plus some control penalty). The resulting "optimal" trajectory is obtained in the form of the solution to the system equations (a model). This input is then given to the system.

Farrenkopf [5] and Swigert [17] demonstrated that velocity and torque shaping can be implemented on systems which modally decompose into second order harmonic oscillators. They showed that inputs in the form of the solutions for the decoupled modes can be added so as not to excite vibration while moving the system. Their technique solves for parameters in a template function, therefore, inputs are limited to the form of the template. These parameters that define the control input are obtained by minimizing some cost function using an optimal formulation. The drawback of this approach is that the inputs are difficult to compute and they must be calculated for each move of the system.

Gupta [22], and Junkins and Turner [18] also included some frequency shaping terms in the optimal formulation. The derivative of the control input is included in the penalty function so that as with cam profiles, the resulting functions are smooth.

Several papers also address the closed loop "optimal" feedback gains which are used in conjunction with the "optimal" open-loop input. [18][24][25]

There are four drawbacks to these "optimal" approaches. First, computation is difficult. Each motion of the system requires recomputation of the control. Though the papers cited above have made major advances toward simplifying this step, it continues to be extremely difficult or impossible to solve for complex systems.

Second, the penalty function does not explicitly include a direct measure of the unwanted dynamics (often vibration). Tracking error is used in the penalty function, therefore, all forms of error are essentially lumped together—the issue of unwanted dynamics is not addressed directly. One side effect is that these approaches penalize residual vibration but allow the system to vibrate during the move. This leads to a lack of robustness under system uncertainties. Removing vibrational energy from a system is difficult especially under conditions of system uncertainty. Techniques that start a move, allowing the system to vibrate and then expect to remove that vibration later in the move lack robustness to slight parameter variations. In addition, vibration is undesirable during a move as well as at the end.

Third, the solutions are limited to the domain of continuous functions. This is an arbitrary constraint which enables the solution of the problem.

Fourth, optimal input strategies depend on move time for how well they work. Different moves will have different vibration excitation levels.

Another technique is based on the concept of the computed torque approach. The system is first modeled in detail. This model is then inverted—the desired output trajectory is specified and the required input needed to generate that trajectory is computed. For linear systems, this might involve dividing the frequency spectrum of the trajectory by the transfer function of the system, thus obtaining the frequency spectrum of the input. For non-linear systems this technique involves inverting the equations for the model. [2]

Techniques that invert the plant have four problems. First, a trajectory must be selected. If the trajectory is impossible to follow, the plant inversion fails to give a usable result. Often a poor trajectory is selected to guarantee that the system can follow it, thus defeating the purpose of the input [2]. Second, a detailed model of the system is required. This is a difficult step for machines which are not extremely simple. Third, the plant inversion is not robust to variations in the system parameters because no robustness criterion has been included in the calculation. Fourth, this technique results in large move time penalties because the plant inversion process results in an acausal input (an input which exists before zero time). In order to use this input, it must be shifted in time thus increasing the move time.

Another approach to command shaping is the work of Meckl and Seering [7] [8] [9] [10] [11]. They investigated several forms of feedforward command shaping. One approach they examined is the construction of input functions from either ramped sinusoids or versine functions. This approach involves adding up harmonics of one of these template functions. If all harmonics were included, the input would be a time optimal rectangular (bang-bang) input function. The harmonics that have significant spectral energy at the natural frequencies of the system are discarded. The resulting input which is given to the system approaches the rectangular shape, but does not excite the resonances.

Aspinwall [1] proposed a similar approach which involves creating input functions by adding harmonics of a sine series. The coefficients of the series are chosen to minimize the frequency content of the input over a band of frequencies. Unlike Meckl, the coefficients were not selected to make the sine series approach a rectangular function, therefore, a large time penalty was incurred.

Wang, Hsia, and Wiederrich [21] proposed yet another approach for creating a command input that moves a flexible system while reducing the residual vibrations. They modeled the system in software and designed a PID controller for the plant that gave a desired response. They then examined the actual input that the controller gave to the software plant and used this for the real system. Next, they refined this input (the reference) with an iteration scheme that adds the error signal to the reference in order to get better tracking of the trajectory. This technique requires accurate modeling of the system and is not robust to parameter uncertainty. In addition, this technique has the implicit assumption that a good response can be achieved with a PID controller. In fact, systems with flexibility cannot be given sufficient damping and a reasonable response time simply by adding a PID controller.

Often a notch filter is proposed for input signal conditioning. This approach gives poor results for several reasons. First, a causal (real time) filter distorts the phase of the resulting signal. This effect is aggravated by lengthening the filter sequence of digital filters or by increasing the order of analog or recursive filters. Therefore, efforts to improve the frequency characteristics of a filter result in increased phase distortion. Also, penalties, such as filter ringing or long move times often result from trying to improve the filter's frequency characteristics.

Singer and Seering [14] investigated an alternative approach of shaping a time optimal input by acausally filtering out the frequency components near the resonances. This has an advantage over notch filtering in that phase distortion and ringing no longer pose a problem. The drawbacks of this approach [14] are the tradeoffs that must be made between fidelity in frequency and reduction of the move time.

SUMMARY OF THE INVENTION

The method according to the invention for generating an input to a system to minimize unwanted dynamics in the system response and to reduce energy consumed by the system during a move includes establishing expressions quantifying the unwanted dynamics. First constraints are established which bound the available input and second constraints are established on variation in system response with variations in system characteristics. A solution is found which minimizes the values of the expressions to determine the input which satisfies the first and second constraints. In one embodiment, the solution involves finding a sequence of impulses for the input which satisfies the expressions and the first and second constraints.

A preferred embodiment of the invention is adapted for shaping an arbitrary command input to a dynamic system to reduce end point vibration. The method includes determining an impulse sequence which eliminates vibration of the dynamic system at its natural frequencies and convolving the impulse sequence with an arbitrary command input. In order to increase the robustness of the input under variations of the system natural frequency and damping ratio, additional constraints are added. In this embodiment, these constraints are derivatives of expressions for residual vibration amplitude.

DESCRIPTION OF THE PREFERRED EMBODIMENT

Most researchers have examined transient vibration in terms of frequency content of the system inputs and outputs. This approach inherently assumes that the system inputs are not actually transient, but are one cycle of a repeating waveform. The approach taken in this invention is fourfold: first, the transient amplitude of a system's unwanted dynamic response will be directly expressed as a function of its transient input. Second, the input will be specified so that the system's natural dynamic tendency is used to cancel unwanted dynamics. Third, the input will be modified to include robustness to uncertainties. Fourth, the case of arbitrary system inputs will be examined.

The first step toward generating a system input which results in a system output without unwanted dynamics is to specify the system response to an impulse input. A linear, vibratory system of any order can be specified as a cascaded set of second-order poles each with the decaying sinusoidal response:

$$y(t) = A \left[ \frac{\omega}{\sqrt{1.0 - \zeta^2}} e^{-\zeta\omega(t-t_o)} \right] \sin \omega \sqrt{1.0 - \zeta^2}(t - t_o), \quad (1)$$

where A is the amplitude of the impulse, $\omega$ is the undamped natural frequency of the plant, $\zeta$ is the damping ratio of the plant, t is time, and $t_o$ is the time of the impulse input. The impulse is usually a torque or velocity command to an actuator. Equation 1 specifies the acceleration or velocity response, y(t), at some point of interest in the system.

Figure 1A:
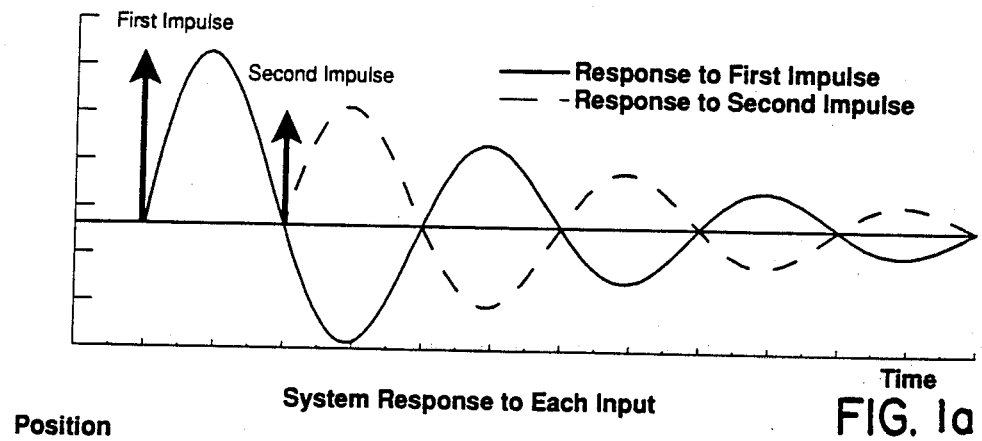
FIGS. 1a and 1b are graphs of end point acceleration versus time.
Figure 1B:
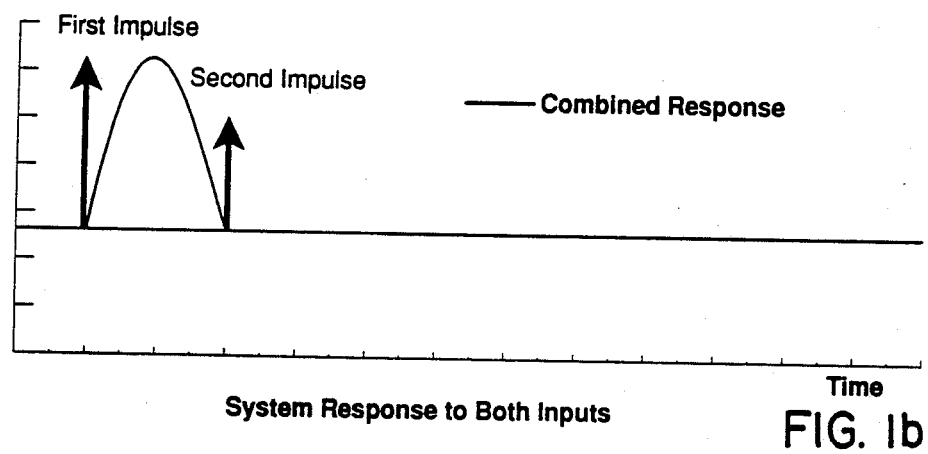
Figure 2:
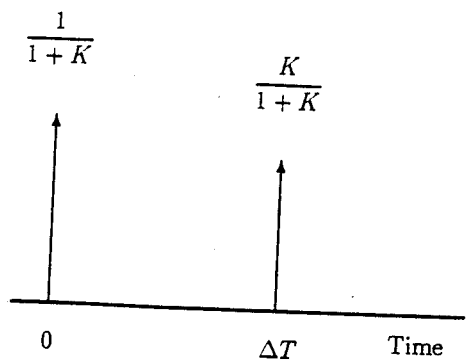
FIG. 2 is a graph illustrating a two-impulse input.

In what follows, only one system vibrational mode is assumed (the general case is treated below). FIG. 1 demonstrates that two impulse responses can be superposed so that the system moves forward without vibration after the input has ended. The two impulse sequence is shown in FIG. 2. The same result can be obtained mathematically by adding two impulse responses and expressing the result for all times greater than the duration of the input. Using the trigonometric relation:

$$B_1 \sin(\alpha t + \phi_1) + B_2 \sin(\alpha t + \phi_2) = A_{amp} \sin(\alpha t + \psi), \quad (2)$$

where $$A_{amp} = \sqrt{(B_1 \cos\phi_1 + B_2 \cos\phi_2)^2 + (B_1 \sin\phi_1 + B_2 \sin\phi_2)^2}$$

$$\psi = \tan^{-1}\left(\frac{B_1 \cos\phi_1 + B_2 \cos\phi_2}{B_1 \sin\phi_1 + B_2 \sin\phi_2}\right),$$

the amplitude of vibration for a multi-impulse input is given by:

$$A_{amp} = \sqrt{\left(\sum_{j=1}^{N} B_j \cos\phi_j\right)^2 + \left(\sum_{j=1}^{N} B_j \sin\phi_j\right)^2} \quad (3)$$

The $B_j$ are the coefficients of the sine term in (1) for each of the N impulse inputs, and the $t_j$ are the times at which the impulses occur. Elimination of vibration after the input has ended requires that the expression for $A_{amp}$ equal zero at the time at which the input ends, $t_{end}$. This is true if both squared terms in 3 are independently zero, yielding:

$$B_1 \cos \phi_1 + B_2 \cos \phi_2 + \ldots + B_N \cos \phi_N = 0 \quad (4)$$

$$B_1 \sin \phi_1 + B_2 \sin \phi_2 + \ldots + B_N \sin \phi_N = 0 \quad (5)$$

with $$B_j = \frac{A_j \omega}{\sqrt{(1 - \zeta^2)}} e^{-\zeta\omega(t_{end} - t_j)}$$

where $A_j$ is the amplitude of the Nth impulse, $t_j$ is the time of the Nth impulse, and $t_{end}$ is the time at which the sequence ends (time of the last impulse). For the two-impulse case, only the first two terms exist in (4) and (5). By selecting 0 for the time of the first impulse ($t_1$), and 1 for its amplitude ($A_1$), two equations (4) and (5) with two unknowns ($A_2$ and $t_2$) result. $A_2$ scales linearly for other values of $A_1$.

Figure 3:
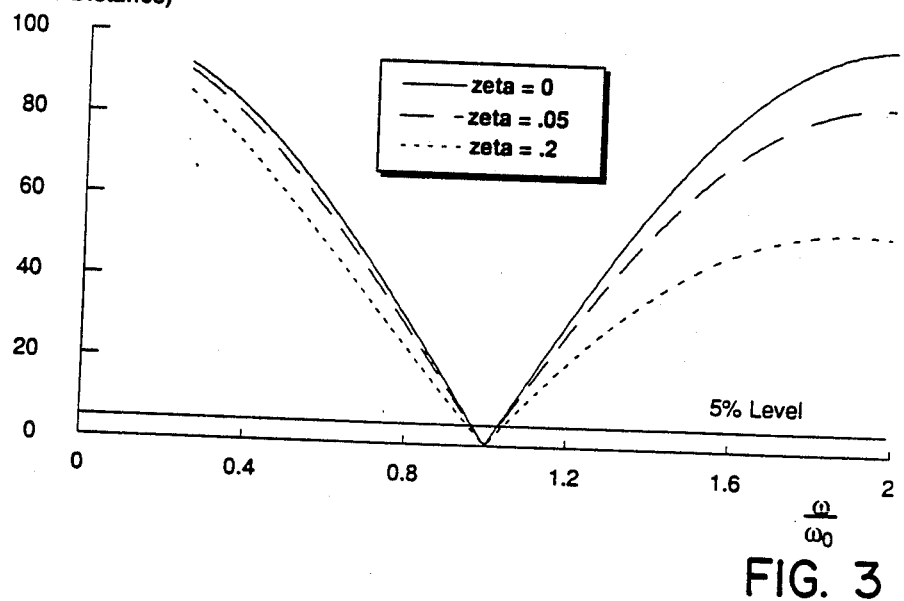
FIG. 3 is a graph of vibration error versus non-dimensional frequency for the two-impulse sequence of FIG. 2.

The two-impulse input, however, cancels vibration only if the system natural frequency and damping ratio are known exactly. In order to quantify the residual vibration level for a system, a vibration-error expression must be defined, here as the maximum amplitude of the residual vibration during a move as a percentage of the amplitude of the rigid body motion. FIG. 3 shows a plot of the vibration error as a function of the system's actual natural frequency. The input was designed for a system with a natural frequency of $\omega_0$. Acceptable response is defined as less than 5% of total move size residual vibration. FIG. 3 shows that the two-impulse input is robust for a frequency variation of less than $\simeq \pm 5\%$.

Figure 4:
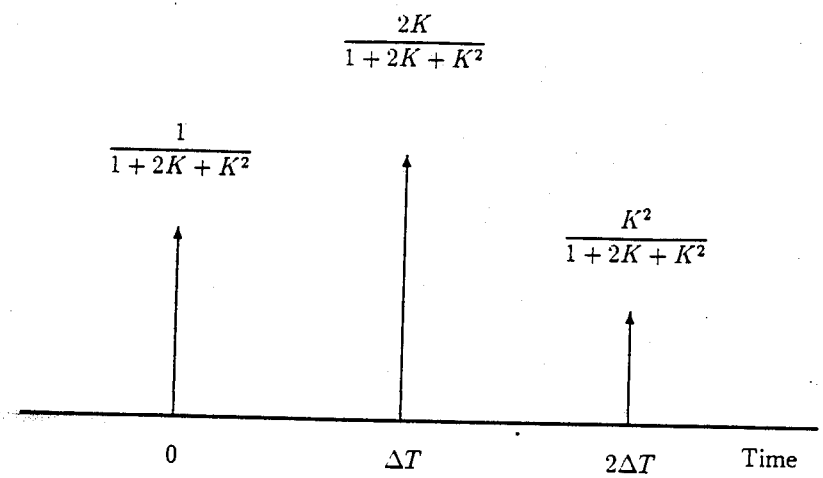
FIG. 4 is a graphical illustration of a three-impulse input.
Figure 5:
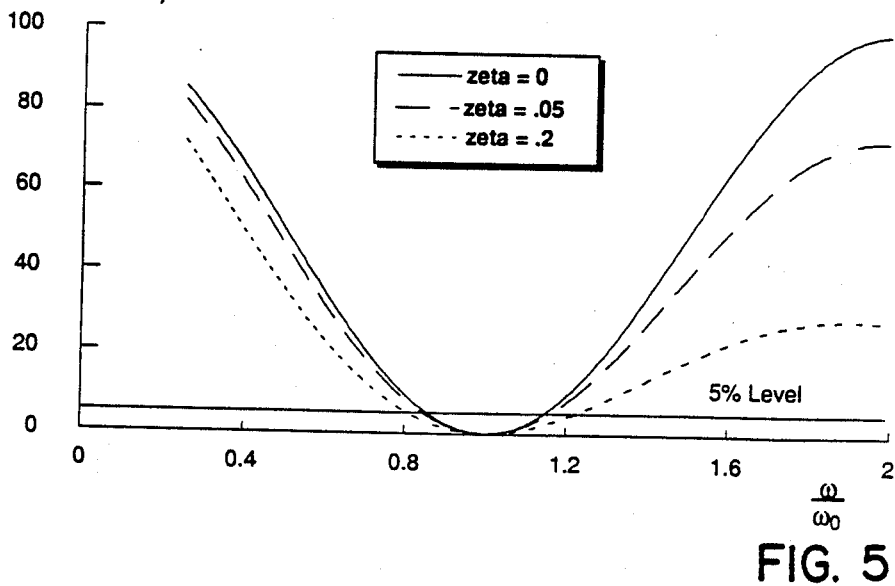
FIG. 5 is a graph of vibration error versus non-dimensional frequency for a three-impulse sequence of FIG. 4.

In order to increase the robustness of the input under variations of the system natural frequency, a new constraint may be added. The derivatives of (4) and (5) with respect to frequency ($\omega$) can be set equal to zero—the mathematical equivalent of setting a goal of small changes in vibration error for changes in natural frequency. Two equations are added to the system; therefore, two more unknowns must be added by increasing the input from two to three impulses (added unknowns: $B_3$ and $t_3$). The corresponding input and vibration error curves are shown in FIGS. 4 and 5. In this case, the input is robust for system frequency variations of $\simeq \pm 20\%$.

Figure 6:
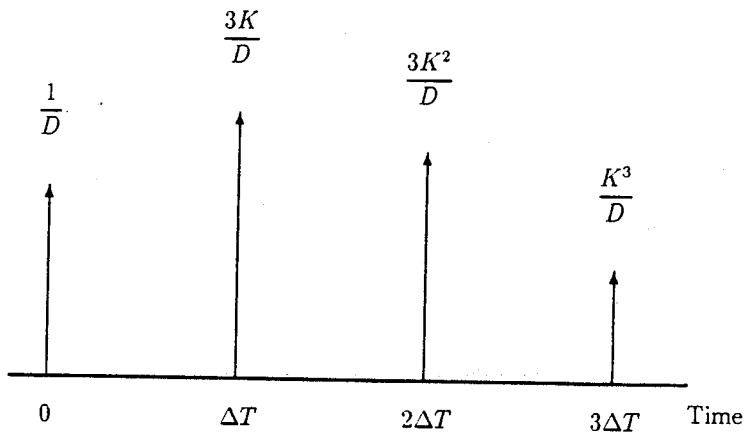
FIG. 6 is a graphical representation of a four-impulse input.
Figure 7:
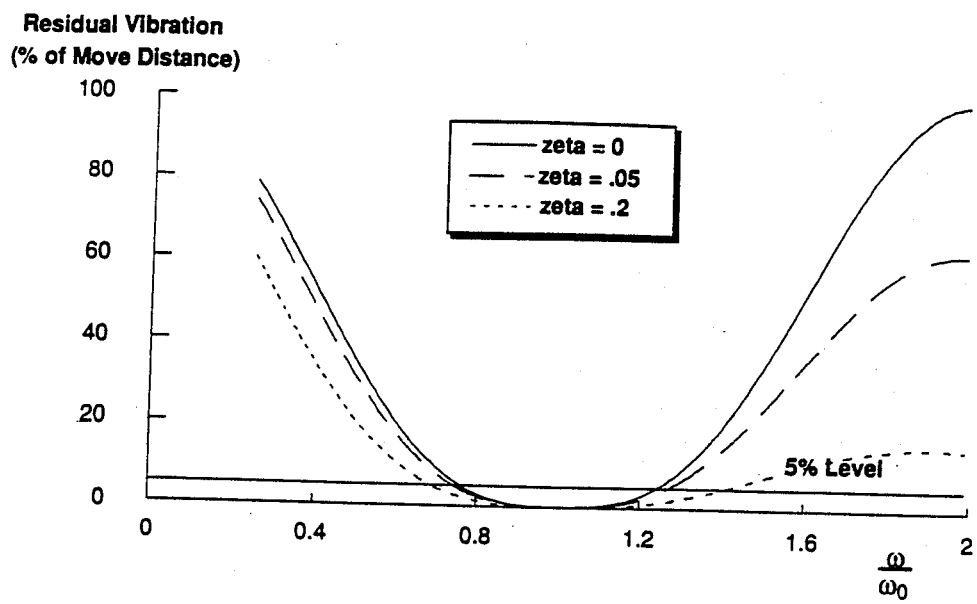
FIG. 7 is a graph of vibration error versus non-dimensional frequency for the four-impulse sequence of FIG. 6.

The process of adding robustness can be further extended to include the second derivatives of (4) and (5) with respect to $\omega$. Setting the second derivatives to 0 requires that the vibration error be flat around the intended natural frequency. Two more constraint equations are added, therefore, the impulse sequence is increased by one to a total of four impulses. The corresponding input and vibration error curves are shown in FIGS. 6 and 7. In this case, the input is robust for system frequency variations of $\simeq -30\% + 40\%$.

Figure 8:
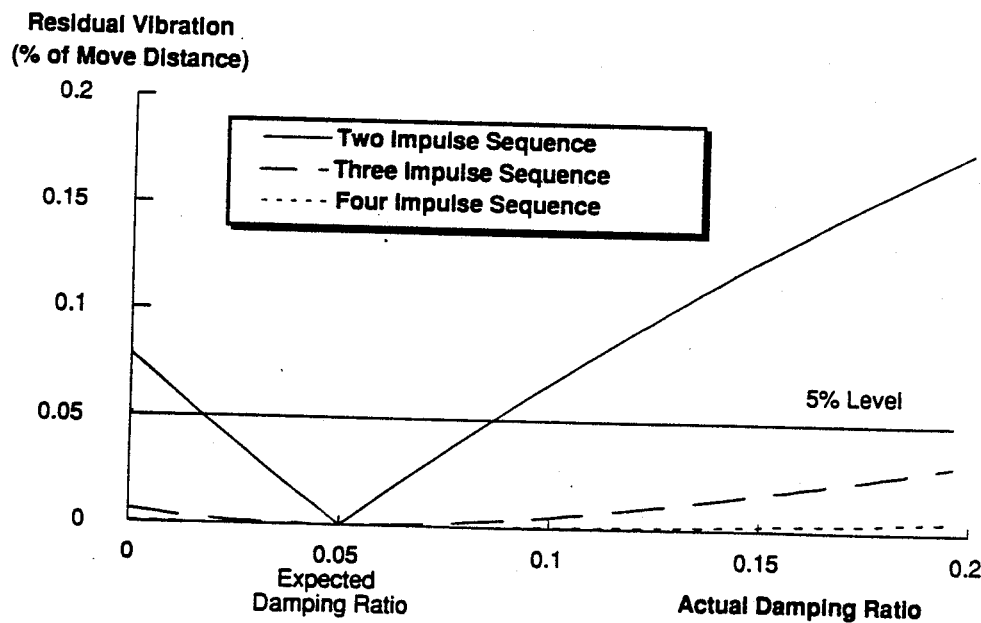
FIG. 8 is a graph of vibration error versus damping ratio for two-, three-, and four-impulse inputs.

In order for these system inputs to be insensitive to system parameter variation, uncertainty in damping ratio must also be considered. As with respect to natural frequency set forth above, the derivative of the amplitude of vibration with respect to damping ratio ($\zeta$) can be computed. It can be shown that the same expressions that guarantee zero derivatives with respect to frequency also guarantee zero derivatives with respect to damping ratio. Therefore, robustness to errors in damping has already been achieved by the addition of robustness to errors in frequency. FIG. 8 shows the vibration-error expression for the same three sequences of impulses discussed above. Note that extremely large variations in damping are tolerated.

The previous discussion assumed only one vibrational mode present in the system. However, the impulse sequence can easily be generalized to handle higher modes. If an impulse or pulse sequence is designed for each of the first two modes of a system independently, they can be convolved to form a sequence which moves a two-mode system without vibration.

The length of the resulting sequence is the sum of the lengths of the individual sequences. The sum, however, is an upper bound on the minimum length of the two-mode sequence which can be generated directly by simultaneously solving together the same equations that generated the two individual sequences. For example, if the four equations used to generate the sequence in FIG. 4 were repeated for a different frequency, a system of eight equations would result and could be solved for four unknown impulse amplitudes and times (plus the first, arbitrary impulse), yielding a five-impulse sequence. The resulting sequence has one less impulse than the result of convolving the two independent sequences, and is always shorter in time. An arbitrary number of such sequences can be combined (either by convolution or by direct solution) to generate an input that will not cause vibration in any of the modes that have been included in the derivation.

The sequences presented thus far have only assumed that the pulses or impulses are positive in magnitude. By using negative-going impulses or pulses, the sequences can be shortened. These sequences can be obtained by expressing the same (or some other equivalent) constraint equations as those presented above. In addition, the limitations on the magnitude of the impulses must be altered to enable negative going sequences. These new equations can be optimized thus yielding a shorter sequence.

The shorter sequence provides the same level of robustness as the longer sequence, however, the delay time is reduced. Unfortunately, there is a tradeoff. The sequences can be made arbitrarily short, but more and more actuator strength is required. In the limit that the sequences are infinitely short, infinite actuation is required. Therefore, the minimum length of the sequence is limited by the physical system's ability to respond.

This can be shown to be consistent with system theory. As the input sequence becomes shorter, we are in effect asking the system to track a very short, high-frequency signal. Since the system is rolling off in magnitude at these higher frequencies, a higher gain is required to get the system to respond. The actuator must supply this higher gain.

If these combined negative and positive impulse sequences are to be normalized, it is important to set some constraints that never let the partial sum of the impulses to exceed a limit. This can be demonstrated by convolving a unit step with this sequence. If at any time during the convolution, the actuator limit is exceeded, the sequence is unacceptable. This constraint can be mathematically formulated by the following:

$$\sum_{i=0}^{j} A_j \leq \text{Limit} \ (j = 2, \ldots, n)$$

where n is the number of impulses.

We have presented above a method for obtaining the shortest system impulse input sequence which simultaneously eliminates vibration at the natural frequencies of interest, includes robustness to system varibility and meets other constraints. We now present a method for using these "time-optimal" sequences to generate arbitrary inputs with the same vibration-reducing properties.

Figure 9A:
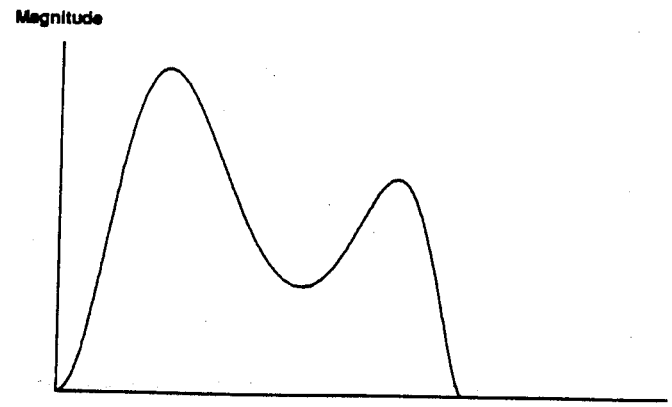
FIGS. 9a, 9b, and 9c are graphs showing the convolution of a command input with a two-impulse sequence.
Figure 9B:
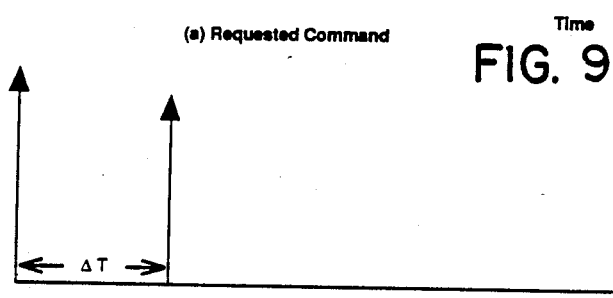
Figure 9C:
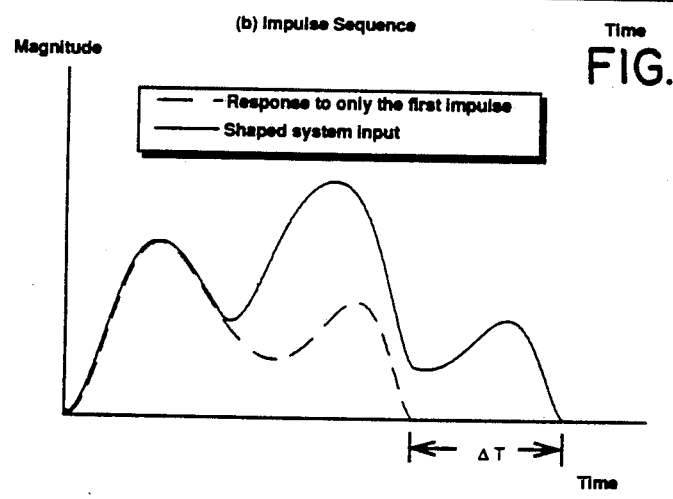

Once the appropriate impulse sequence has been developed, it represents the shortest input that meets the desired design criteria. Therefore, if the system is commanded to make an extremely short move (an impulse motion), the best that can be commanded in reality is the multiple-impulse sequence that was generated for the system. Just as the single impulse is the building block from which any arbitrary function can be formed, this sequence can be used as a building block for arbitrary vibration-reducing inputs. The vibration reduction can be accomplished by convolving any arbitrary desired input to the system together with the impulse sequence in order to yield the shortest actual system input that makes the same motion without vibration. The sequence, therefore, becomes a prefilter for any input to be given to the system. The time penalty resulting from prefiltering the input equals the length of the impulse sequence (on the order of one cycle of vibration for the sequences discussed above). FIG. 9 shows the convolution of an input (for example, the signal from a joystick in a teleoperated system) with a non-robust, two-impulse sequence.

The impulse sequences set out above have been normalized to sum to one. This normalization guarantees that the convolved motor input never exceeds the maximum value of the commanded input. If the commanded input is completely known in advance for a particular move, the convolved motor input can be rescaled so that the maximum value of the function is the actuator limit of the system.

For historical reference, the result of convolving a non-robust two-impulse sequence with a step input yields the Posicast input developed by O. J. M. Smith in 1958. The robustness plot of FIG. 3 demonstrates why Posicast is not generally used.

The shaped commands have been tested on a computer model of the Space Shuttle Remote Manipulator System (RMS) which was developed for NASA by Draper Laboratories. This computer model includes many of the complicating features of the hardware Shuttle manipulator such as stiction/friction in the joints; non-linear gear box stiffness; asynchronous communication timing; joint freeplay; saturation; and digitization effects. The simulation has been verified with actual space shuttle flight data. Excellent agreement was obtained for both steady state and transient behavior.

Figure 10:
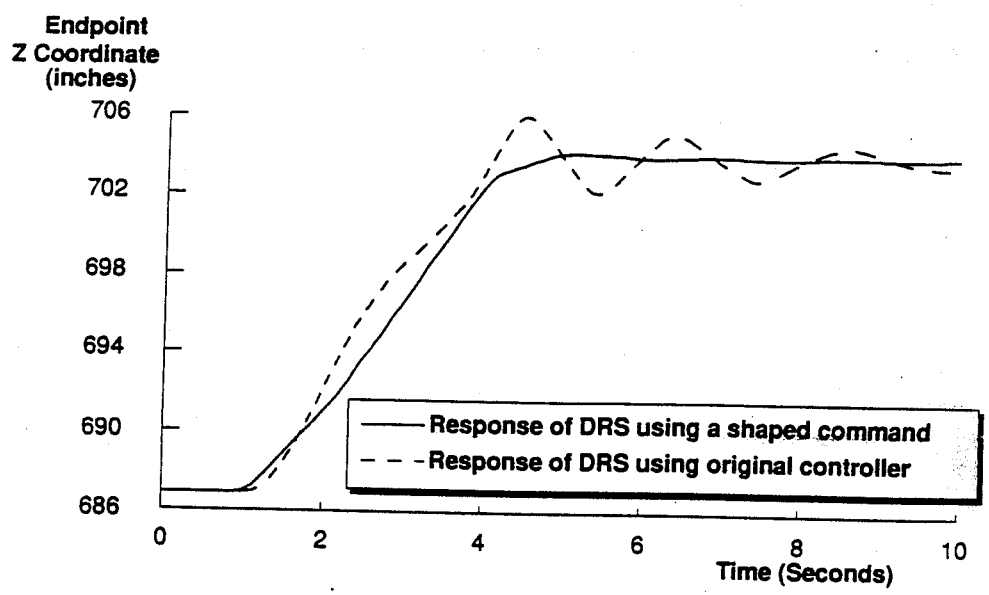
FIG. 10 is a graph of an end point coordinate versus time.

FIG. 10 shows a comparison between the current Shuttle RMS controller and a step input in velocity which was prefiltered by a three-impulse sequence. The residual vibration is reduced by more than one order of magnitude for the unloaded shuttle arm. Comparable results were obtained for a variety of moves tested.

The use of shaped inputs for commanding computer-controlled machines shows that significant reduction in unwanted dynamics can be achieved. The cost in extended move time is small (on the order of one cycle of vibration), especially when compared to the time saved in waiting for settling of the machine's vibrations. A straightforward design approach for implementing this preshaping technique has been presented in this specification.

Although the above examples have utilized impulse sequences, it should be understood that finite duration pulses instead of impulses can form the building blocks for shaping command inputs. The pulses or impulses can be constrained to begin at specified intervals along with the additional constraint that the impulses or pulses are fixed in amplitude but are variable in duration. Further, constraints can be applied that the pulses begin and/or end at specified intervals.

Figure 11:
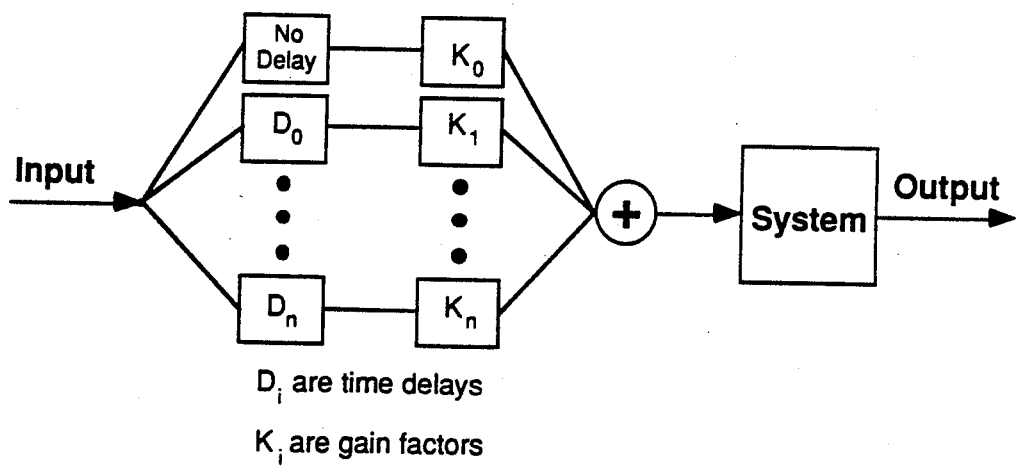
FIG. 11 is a schematic illustration of a standard implementation of the invention disclosed herein.

FIG. 11 illustrates the standard implementation of the invention discussed above. An input is applied to a shaping routine that scales the input and submits it to the system. At later times, it resubmits the input to the system scaled by different amounts, so that the output has a reduction in the unwanted dynamics with a specified level of robustness to system parameter changes. This approach applies to most computer controlled machines, chemical, and electronic systems.

APPENDIX

[1] Aspinwall, D. M., "Acceleration Profiles for Minimizing Residual Response", *Journal of Dynamic Systems, Measurement, and Control*, Mar. 1980. Vol. 102, No. 1, pp 3-6

[2] Bayo, E., "Computed Torque for the Position Control of Open-Chain Flexible Robots.", Proceedings of the 1988 *IEEE International Conference on Robotics and Automation.*, Apr. 25-29, 1988. Philadelphia, Pa., pp 316-321

[3] Bayo, E.; and Paden, B., "On Trajectory Generation for Flexible Robots.", *Journal of Robotic Systems*, Feb. 1987. Vol. 4, No. 2, pp 229-235.

[4] Dubowsky, S.; and Shiller, Z., "Optimal Dynamic Trajectories for Robotic Manipulators", *Theory and Practice of Robots and Manipulators. Proceedings of RoManSy 1984, The Fifth CISM-IFToMM Symposium*, MIT Press, Cambridge, MA,

[5] Farrenkopf, R. L., "Optimal Open-Loop Maneuver Profiles for Flexible Spacecraft.", *Journal of Guidance and Control.*, Vol. 2, No. 6, Nov.-Dec. 1979. pp 491-498.

[6] Jones, James F., Petterson, Ben J., "Oscillation Damped Movement of Suspended Objects", *Proceedings of the 1988 IEEE International Conference on Robotics and Automation.*, Apr. 25-29, 1988. Philadelphia, Pa., pp 956-962

[7] Meckl, P. and Seering, W., "Minimizing Residual Vibration for Point-to-point Motion.", *ASME Journal of Vibration, Acoustics, Stress, and Reliability in Design*, Vol. 107, No. 4., Oct. 1985. pp 378-382.

[8] Meckl, P. and Seering, W., "Active Damping in a Three-Axis Robotic Manipulator.", *Journal of Vibration, Acoustics, Stress, and Reliability in Design*, Vol. 107, No. 1, Jan. 1985. pp 38-46.

[9] Meckl, Peter H., and Seering, Warren P., "Feedforward Control Techniques To Achieve Fast Settling Time in Robots", *Proceedings of The American Controls Conference*, Seattle, Wa., Jun. 1986.

[10] Meckl, Peter H., and Seering, Warren P., "Reducing Residual Vibration in Systems with Time Varying Resonances.", *Proceedings of the 1987 IEEE International Conference on Robotics and Automation.*, Mar. 31-Apr. 3, 1987. Raleigh, N.C., pp 1690-1695.

[11] Meckl, Peter H., and Seering, Warren P., "Controlling Velocity-Limited Systems to Reduce Residual Vibration,", *Proceedings of the 1988 IEEE International Conference on Robotics and Automation.*, Apr. 25-29, 1988. Philadelphia, Pa.,

[12] Sehitoglu, H.; and Aristizabal, J. H., "Design of a Trajectory Controller for Industrial Robots Using Bang-Bang and Cycloidal Motion Profiles", *Robotics: Theory and Applications*, ASME Winter Annual Meeting, Anaheim, CA, Dec. 1986. pp 169-175

[13] Singer, Neil C.; Seering, Warren P., "Controlling Vibration in Remote Manipulators.", *ASME Design Automation Conference.*, Boston, MA., Sept. 27-30, 1987. Vol. 2, pp 11

[14] Singer, Neil C.; Seering, Warren P., "Using Acausal Shaping Techniques to Reduce Robot Vibration.", *Proceedings of the 1988 IEEE International Conference on Robotics and Automation.*, Philadelphia, PA., Apr. 25-29, 1988.

[15] Singer, Neil C.; Seering, Warren P., "Preshaping Command Inputs to Reduce System Vibration", *Submitted to the ASME Journal of Dynamic Systems Measurement and Control*, Mar., 1988.

[16] Smith, O. J. M., "Feedback Control Systems.", McGraw-Hill Book Company, Inc., N.Y., 1958.

[17] Swigert, C. J., "Shaped Torque Techniques.", *Journal of Guidance and Control.*, Sept.-Oct. 1980. Vol. 3, No. 5, pp 460-467.

[18] Junkins, John L.; Turner, James D.; "Optimal Spacecraft Rotational Maneuvers", Elsevier Science Publishers, N.Y., 1986.

[19] Chun, Hon M.; Turner, James D.; and Juang, Jer-Nan, "Disturbance-Accomodating Tracking Maneuvers of Flexible Spacecraft.", *Journal of the Astronautical Sciences.*, Apr.-Jun. 1985. Vol. 33, No. 2, pp 197-216.

[20] Hattis, P.; Lepanto, J.; Sargent, D.; Turnbull, J., "A Survey of the Payload Deployment and Retrieval System Environment.", *Charles Stark Draper Laboratory Technical Report.*, No. CSDL-P-1838, Jan. 1984.

[21] Wang, S.; Hsia, T. C.; Wiederrich, J. L., "Open-Loop Control of a Flexible Robot Manipulator", *International Journal of Robotics and Automation*, Vol. 1, No. 2, 1986. pp 54-57

[22] Gupta, Narendra K., "Frequency-Shaped Cost Functionals: Extension of Linear-Quadratic-Gaussian Design Methods", *Journal of Guidance and Control*, Vol. 3, No. 6, Nov.-Dec 1980. pp 529-535

[23] Juang, Jer-Nan, "Optimal Design of a Passive Vibration Absorber for a Truss Beam.", *AIAA Journal of Guidance and Control.*, Vol. 7, No. 6, Nov.-Dec. 1984. pp 733-739.

[24] Juang, Jer-Nan; Turner, James D.; and Chun, Hon M., "Closed-Form Solutions for Feedback Control with Terminal Constraints.", *Journal of Guidance and Control*, Jan.-Feb. 1985. Vol. 8, No. 1, pp 39-43

[25] Chun Hon M.; Turner, James D.; and Juang, Jer-Nan, "Disturbance-Accomodating Tracking Maneuvers of Flexible Spacecraft.", *Journal of the Astronautical Sciences.*, Apr.-Jun. 1985. Vol. 33, No. 2, pp 197-216.

We claim:

1. A method for generating an input to a physical system to minimize unwanted dynamics in the physical system response comprising:

establishing expressions quantifying the unwanted dynamics of the physical system;

establishing first constraints bounding the available input to the physical system;

establishing second contraints on variation in system response with variations in the physical system characteristics; finding a solution which is used to generate the input which minimizes the value of the expressions while satisfying the first and second constraints; and controlling the physical system based on the input to the physical system whereby unwanted dynamics are minimized.

2. The method of claim 1 wherein the solution is a sequence of impulses for the input which satisfies the expressions and the first and second constraints.

3. The method of claim 1 wherein the solution is a sequence of finite duration pulses which satisfies the expressions and the first and second constraints.

4. The method of claim 1 wherein the solution is a sequence of impulses or pulses that begin at specified intervals.

5. The method of claim 1 wherein the solution is a sequence of impulses or pulses which are fixed in amplitude but variable in duration.

6. The method of claim 1 wherein the solution is a sequence of pulses which are variable in amplitude but fixed in duration.

7. The method of claim 1 wherein the physical system is a mechanical system.

8. The method of claim 1 wherein the physical system is an electrical system.

9. The method of claim 1 wherein the physical system is a chemical system.

10. The method of claim 1 wherein the dynamic system has p vibrational modes characterized by undamped natural frequencies $\omega_i$ and damping ratios $\zeta_i$, i=1 ... p, establishing p sets of constraint equations, with the equations representing the first and second series of constraints and solving the p constraint equations simultaneously to yield a new input sequence.

11. Method for shaping an arbitrary command input to a dynamic physical system to reduce unwanted dynamics in the physical system comprising:
determining an impulse sequence which eliminates unwanted dynamics of the physical system;
convolving the impulse sequence with the arbitrary command input to shape the input; and
controlling the physical system based on the shaped command input to the physical dynamic system.

12. The method of claim 11 wherein the impulse sequence is selected to improve robustness to system variability.

13. The method of claim 1 or claim 11 wherein the dynamic system has a single vibrational mode characterized by an undamped natural frequency $\omega_1$ and a damping ratio $\zeta_1$ and impulse sequences determined as the solution to the equations $$\sum_{j=1}^{N} B_j \cos\phi_j = 0$$

$$\sum_{j=1}^{N} B_j \sin\phi_j = 0$$

$$\frac{d}{d\omega}\left[\sum_{j=1}^{N} B_j \cos\phi_j\right] = 0$$

$$\frac{d}{d\omega}\left[\sum_{j=1}^{N} B_j \sin\phi_j\right] = 0$$

$$\vdots$$

$$\frac{d^M}{d\omega^M}\left[\sum_{j=1}^{N} B_j \cos\phi_j\right] = 0$$

$$\frac{d^M}{d\omega^M}\left[\sum_{j=1}^{N} B_j \sin\phi_j\right] = 0$$

where $$B_j = \frac{A_j \omega_1}{\sqrt{(1-\zeta^2)}} e^{-\zeta_1 \omega_1 (t_{end} - t_j)}$$

$$\phi_j = \omega_1 \sqrt{(1-\zeta_1^2)} \, t_j$$

and
$A_j$ is the amplitude of the jth impulse.

14. The method of claim 13 where N=3 and M=1.

15. The method of claim 14 wherein impulses or pulses are allowed to assume negative values.

16. The method of claim 13 where N=4 and M=2.

17. The method of claim 16 wherein impulses or pulses are allowed to assume negative values.

18. The method of claim 13 where M is any integer value and N=M+2.

19. The method of claim 18 wherein impulses or pulses are allowed to assume negative values.

20. The method of claim 13 wherein impulses or pulses are allowed to assume negative values.

21. Method for shaping an arbitrary command input to a dynamic physical system having multiple vibrational modes to reduce end point vibration comprising:
determining impulse sequences which eliminate vibration of the dynamic physical system at the natural frequencies of its modes;
convolving the impulse sequences with the arbitrary command input to shape the input; and
controlling the physical system based on the shaped command input to the dynamic physical system.

22. Method for shaping an arbitrary command input to a dynamic physical system having p vibrational modes characterized by undamped natural frequencies $\omega_1$ and damping ratios $\zeta_i$, i=1 ... p, to reduce endpoint vibration comprising:
determining p impulse sequences which eliminate vibration of the dynamic physical system at the natural frequencies of its modes;
convolving the impulse sequences with the arbitrary command input to shape the input; and
controlling the physical system based on the shaped command input to the dynamic physical system.

23. The method of any one of claims 1-12 or 21-10 wherein impulses or pulses are allowed to assume negative values.

24. Apparatus for shaping an arbitrary command input to a dynamic physical system to reduce endpoint vibration comprising:
computing apparatus for determining an impulse sequence which eliminates vibration of the dynamic physical system at its natural frequencies;
apparatus for convolving the impulse sequence with the arbitrary command input to shape the input; and
apparatus for controlling the physical system based on the shaped command input to the dynamic physical system.

25. Method for generating an input to a physical system having varying characteristics to minimize unwanted dynamics in the physical system response comprising:
establishing expressions quantifying the unwanted dynamics of the physical system;
establishing first constraints bounding the available input to the physical system;
establishing second constraints on variation in physical system response with variations in the physical system varying characteristics;
finding a solution which is used to generate an input which minimizes the value of the expressions while satisfying the first and second constraints, whereby the solution tracks the varying system; and
controlling the physical system based on the input to the physical system whereby unwanted dynamics are minimized in the varying system.

26. Method for shaping an arbitrary command input to a varying dynamic physical system to reduce unwanted dynamics in the physical system comprising:

determining an input sequence which eliminates unwanted dynamics of the physical system;
convolving the impulse sequence with the arbitrary command input to shape the input; and
controlling the physical system based on the shaped command input to the varying dynamic physical system.

27. Method for generating an input to a robot arm to minimize unwanted dynamics in the robot arm response comprising:

establishing expressions quantifying the unwanted dynamics of the robot arm;
establishing first constraints bounding the available input to the robot arm;
establishing second constraints on variation in robot arm response with variation in robot arm characteristics;
finding a solution which is used to generate the input which minimizes the value of the expressions while satisfying the first and second constraints; and
controlling the robot arm based on the input whereby unwanted dynamics are minimized.

* * * * *

UNITED STATES PATENT AND TRADEMARK OFFICE
CERTIFICATE OF CORRECTION

PATENT NO. : 4,916,635

DATED : April 10, 1990

INVENTOR(S) : Neil C. Singer, et al.

It is certified that error appears in the above-identified patent and that said Letters Patent is hereby corrected as shown below:

Column 5, line 37   In the figure (3), please add the following which was omitted:
$$\phi_j = \omega \sqrt{(1 - \zeta^2)} t_j$$

Column 12, line 23: Change "$\omega_1$" to -- $\omega_i$ --.
        line 33: Change "1-12 or 21-10" to -- 1-6, 10-12 or 21-22.--.

Signed and Sealed this

Twenty-sixth Day of May, 1992

Attest:

DOUGLAS B. COMER

*Attesting Officer*    *Acting Commissioner of Patents and Trademarks*

(12) EX PARTE REEXAMINATION CERTIFICATE (6836th)
United States Patent
Singer et al.

(10) Number: US 4,916,635 C1
(45) Certificate Issued: May 26, 2009

(54) SHAPING COMMAND INPUTS TO MINIMIZE UNWANTED DYNAMICS

(75) Inventors: Neil C. Singer, Brookline, MA (US); Warren P. Seering, Sherborn, MA (US); Kenenth A. Pasch, Brookline, MA (US)

(73) Assignee: Massachusetts Institute of Technology, Cambridge, MA (US)

Reexamination Request:
No. 90/008,525, Mar. 7, 2007
No. 90/008,561, Mar. 28, 2007
No. 90/010,123, Mar. 13, 2008

Reexamination Certificate for:
Patent No.: 4,916,635
Issued: Apr. 10, 1990
Appl. No.: 07/243,315
Filed: Sep. 12, 1988

Certificate of Correction issued May 26, 1992.

(51) Int. Cl.
G05B 19/19 (2006.01)

(52) U.S. Cl. .............................. 700/254; 700/79; 700/88
(58) Field of Classification Search ................... 700/254
See application file for complete search history.

(56) References Cited

U.S. PATENT DOCUMENTS

| | | |
|---|---|---|
| 2,801,351 A | 7/1957 | Calvert et al. |
| 2,996,689 A | 8/1961 | Constant |
| 3,660,744 A | 5/1972 | Plummer |
| 3,960,043 A | 6/1976 | Brand |
| 4,091,236 A | 5/1978 | Chen |
| 4,195,265 A | 3/1980 | Vail |
| 4,477,755 A | 10/1984 | Rickert |
| 4,701,875 A | 10/1987 | Konishi et al. .............. 708/420 |
| 4,796,112 A | 1/1989 | Mizukami et al. |
| 4,873,646 A | 10/1989 | Stoops |
| 4,879,643 A | 11/1989 | Chakravarty et al. |
| 4,929,874 A | 5/1990 | Mizuno et al. |
| 4,937,689 A | 6/1990 | Seaver et al. |
| 4,937,758 A | 6/1990 | Hayden et al. |
| 4,963,806 A | 10/1990 | Shinohara et al. |
| 5,032,776 A | 7/1991 | Garagnon |

OTHER PUBLICATIONS

Donald J. Gimpel "Signal Component Control: A Dissertation" Submitted to the Graduate School in Partial Fulfillment of the Requirements for the degree Doctor of Philosophy, Northwestern University Department of Electrical Engineering, Oct. 1952.
V.C. Shields and G. Cook, "Application of an approximate time delay to a Posicast control system," Oct. 1970, Int. J. Control, 1971, vol. 14, No. 4.
Evert S. Cooper, "Design of a Disk–File Reference–Velocity Generator," Sep. 1985, IEEE Transactions of Magnetics, vol. 5.
Gerald Cook, "Control of Flexible Structures Via Posicast," 1986, Dept. of Electrical & Computer Engineering, George Mason University, Fairfax, VA, IEEE.
George G. Gorbatenko, "Posicast Control by Delayed Gain," Feb. 1965, Control Engineering.
Tallman, G. H. and Smith, O.J. M., "Analog Study of Dead–Beat Posicast Control", IRE, Transactions on Automatic Control, 1958.

(Continued)

*Primary Examiner*—Fred Ferris

(57) ABSTRACT

A sequence of impulses is determined which eliminates unwanted dynamics of a dynamic system. This impulse sequence is convolved with an arbitrary command input to drive the dynamic system to an output with a minimum of unwanted dynamics. The input sequence is time optimal in that it constitutes the shortest possible command input that results in no unwanted dynamics of the system subject to robustness and implementation constraints. The preshaping technique is robust under system parameter uncertainty and may be applied to both open and closed loop systems.

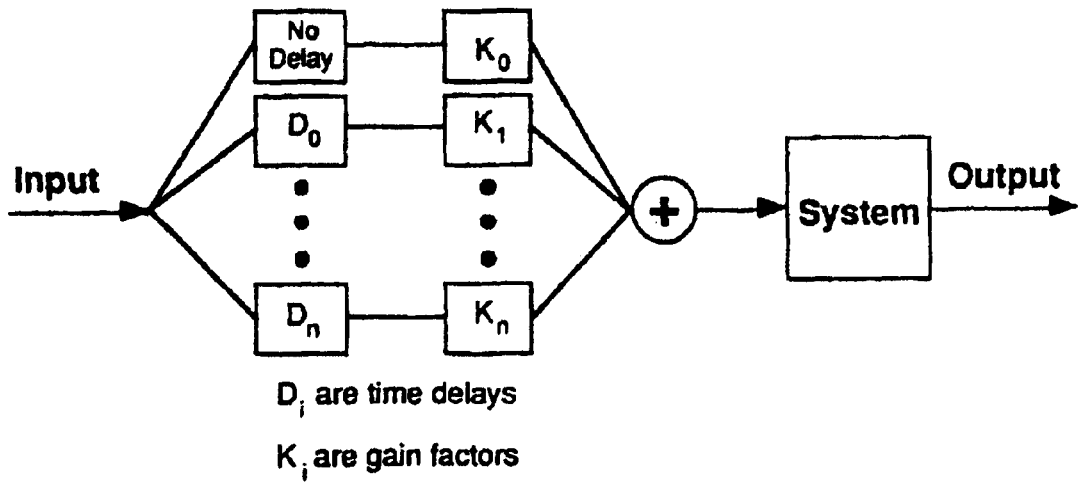

OTHER PUBLICATIONS

Meckl, Peter H. and Seering,Warren P., Reducing Residual Vibration in Systems with Time–Varying Resonances, 1987 IEEE International Conference on Robotics and Automation, vol. 3, 1987.

R.K. Oswald, "Design of a Disk File Head–Positioning Dervo", IBM Journal of Research and Development, vol. 18, No. 6, Nov. 1974.

Commander, Robert D. and Taylor J. R., Servo Design for an Eight Inch Disk File, IBM Disk Storage Technology, Feb. 1980.

Breakwell, John A., Optimal Feedback Slewing of Flexible Spacecraft, J. Guidance and Control, vol. 4, No. 5, 1981.

Samuels, Ferdinand A., Beyond the Second Order System in Track Flowing Servos, IEEE Transactions on Magnetics, Vol, Mag–14, No. 4, Jul. 1978.

Kelley, Hanry J., Guidance Theory and External Fields, IRE Transactons on Automatic Control, 1962.

Werner, Ronald A. and Cruz, Jose B. Jr., Feedback Control Which Preserves Optimality for Systems with Unknown Parameters, IEEE Transactions on Automatic Control, Vol, AC–13, No. 5, Dec. 1958.

Yamada, I., Nakagawa, M., Reduction of Residual Vibrations in Positioning Control Mechanism, Journal of Vibration, Acoustics, Stress, and Reliability in Design, vol. 107, Jan. 1985.

Control Data Corporation, Cartridge Module Drive Hardware Maintenance Manual, 1979.

Control Data Corporation—Finch Disk Drive Model 9410 hardware Maintenance Manual, 1983.

Phillips & Nagle, Digital control Systems Analysis and Design, Prentice Hall, Inc., 1984.

Franklin and Powell, Digital Control, Addison Wesley Publishing Company 1980.

Franklin, Powell, and Enami–Naeini, Feedback Control of Dynamic Systems, Addison Wesley Publishing Company, 1986.

C.J. Swigert, Shaped Torque Techniques, 1980.

IBM TDB, R. S. Palmer, Automatic Notch Frequency Control for Servo Stabilization, vol. 19, No. 10, Mar. 1977, pp. 3860–3862, IBM TDB, R. S. Palmer, Oscillating Notch Filter, vol. 19, No. 10, Mar. 1977.

F.L. Farrenkoph, Optimal Open–Loop Maneuver Profiles for Flexible Spacecraft, J. Guidance and Control, vol. 2, No. 6, Nov.–Dec. 1980.

Tallman, G.H. & Smith, O.J.M., "Analog Study of Dead–Beat Posicast Control" *IRE Transactions on Automatic Control* 14–21 (Mar. 1958).

Phillips et al., "Digital Control System Analysis and Design," Prentice–Hall 1984, Chapter 11, pp. 328–354.

Bryson and Ho, Applied Optimal Control, Hemisphere Publishing Corporation, 1975.

Mee, D. H., (Jan./Feb. 1974) "A Feedback Implementation of Posicast Control Using Sampling Circuits", *Proceedings of the IREE*, pp. 11–15.

Michail, Michel S., (Jun. 1967) "Improving Transient Response of Control Systems Using Switching Techniques", *IEEE Transactions on Automatic Control*, pp. 342–343.

Smith, Otto J. M., (Original manuscript received by the IRE, Nov. 12, 1956; revised manuscript received Jun. 12, 1957) "Posicast Control of Damped Oscillatory Systems", *Proceedings of the IRE*, pp. 1249–1255.

Tallman, G. H. et al., (Jul. 20, 1957) "Analog Study of Dead–Beat Posicast Control", *PGAC*, pp. 14–21.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1–4 and 7 is confirmed.

Claims 11, 21 and 24 are cancelled.

Claims 5, 6, 8–10, 12–20, 22, 23, 25, 26 and 27 were not reexamined.

* * * * *

(12) EX PARTE REEXAMINATION CERTIFICATE (7939th)
United States Patent
Singer et al.

(10) Number: US 4,916,635 C2
(45) Certificate Issued: Dec. 14, 2010

(54) SHAPING COMMAND INPUTS TO MINIMIZE UNWANTED DYNAMICS

(75) Inventors: Neil C. Singer, Brookline, MA (US); Warren P. Seering, Sherborn, MA (US); Kenneth A. Pasch, Brookline, MA (US)

(73) Assignee: Massachusetts Institute of Technology, Cambridge, MA (US)

Reexamination Request:
No. 90/010,586, Jun. 26, 2009

Reexamination Certificate for:
Patent No.: 4,916,635
Issued: Apr. 10, 1990
Appl. No.: 07/243,315
Filed: Sep. 12, 1988

Reexamination Certificate C1 4,916,635 issued May 26, 2009

Certificate of Correction issued May 26, 1992.

(51) Int. Cl.
*G05B 19/19* (2006.01)

(52) U.S. Cl. .............................. 700/254; 700/79; 700/88
(58) Field of Classification Search ........................ None
See application file for complete search history.

(56) References Cited

PUBLICATIONS

Prucz et al., "An Analysis of Pulse Control for Simple Mechanical Systems," J. Dynamic Systems, Measurement and Control, vol. 107, pp. 123–131 (Jun. 1985).
Zhao et al., "Dead–beat Control with Robustness," Int. J. Control, vol. 43, No. 5, pp. 1427–1440 (1986).
VanLangingham, "Introduction to Digital Control Systems," MacMillan Publ., pp. ix–xii, 3, 8–10, 40–42, 60–63, 75, 103–107, 194–196, 219–222, 243, 263–276 (1985).
Cook, C. "Posicast Versus Conventional Types of Compensation In A Control System," MIT Masters Thesis (1962).

*Primary Examiner*—Christopher E Lee

(57) ABSTRACT

A sequence of impulses is determined which eliminates unwanted dynamics of a dynamic system. This impulse sequence is convolved with an arbitrary command input to drive the dynamic system to an output with a minimum of unwanted dynamics. The input sequence is time optimal in that it constitutes the shortest possible command input that results in no unwanted dynamics of the system subject to robustness and implementation constraints. The preshaping technique is robust under system parameter uncertainty and may be applied to both open and closed loop systems.

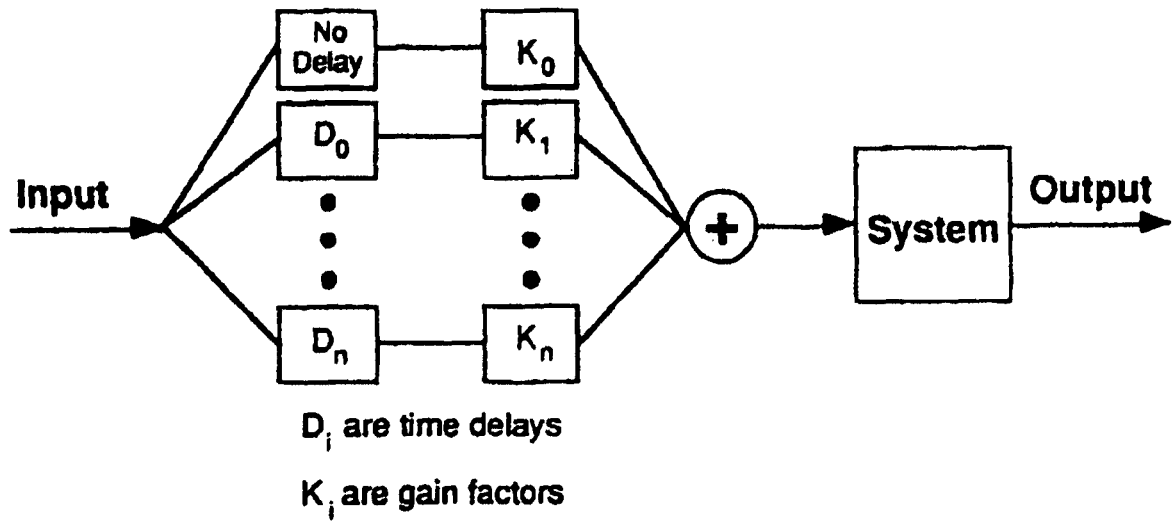

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-4 and 7 is confirmed.

Claims 11, 21 and 24 were previously cancelled.

Claims 5, 6, 8-10, 12-20, 22, 23 and 25-27 were not reexamined.

* * * * *